United States Patent [19]

Ormiston et al.

[11] 3,999,886
[45] Dec. 28, 1976

[54] HINGELESS HELICOPTER ROTOR WITH IMPROVED STABILITY

[75] Inventors: Robert A. Ormiston, Sunnyvale; William G. Bousman, Menlo Park; Dewey H. Hodges, San Jose, all of Calif.; David A. Peters, Fairview Heights, Ill.

[73] Assignee: The United States of America as represented by the Administrator of the National Aeronautics and Space Administration, Washington, D.C.

[22] Filed: Oct. 10, 1974

[21] Appl. No.: 513,612

[52] U.S. Cl. .............................. 416/104; 416/141; 416/138
[51] Int. Cl.² ........................................ B64C 27/44
[58] Field of Search ......................... 416/103–107, 416/132, 226, 230, 240, 241 A, 131, 135, 138, 141, 134

[56] References Cited

UNITED STATES PATENTS

| | | | |
|---|---|---|---|
| 1,927,966 | 9/1933 | Vaughn | 416/141 X |
| 2,397,489 | 4/1946 | Jenkins et al. | 416/104 |
| 2,580,363 | 12/1951 | Schnitt | 416/226 |
| 2,755,869 | 7/1956 | Magill | 416/104 |
| 2,757,745 | 8/1956 | Ver Hage et al. | 416/138 X |
| 3,232,349 | 2/1966 | Ballauer | 416/141 X |
| 3,261,407 | 7/1966 | Culver et al. | 416/226 X |
| 3,330,362 | 7/1967 | Kastan | 416/226 X |
| 3,484,174 | 12/1969 | McCoubrey | 416/226 X |
| 3,528,753 | 9/1970 | Dutton et al. | 416/226 |
| 3,669,566 | 6/1972 | Bourquardez | 416/134 |
| 3,874,820 | 4/1975 | Fenaughty | 416/226 |
| 3,879,153 | 4/1975 | Breuner | 416/141 |

FOREIGN PATENTS OR APPLICATIONS

| | | | |
|---|---|---|---|
| 1,044,232 | 11/1953 | France | 416/141 |
| 479,461 | 1938 | United Kingdom | 416/141 |

*Primary Examiner*—Everette A. Powell, Jr.
*Attorney, Agent, or Firm*—Darrell G. Brekke; Gary F. Grafel; John R. Manning

[57] ABSTRACT

Improved stability is provided in a hingeless helicopter rotor by inclining the principal elastic flexural axes and coupling pitching of the rotor blade with the lead-lag bending of the blade. The primary elastic flex axes can be inclined by constructing the blade of materials that display non-uniform stiffness and the specification describes various cross section distributions and the inclined flex axes resulting therefrom. Also described are arrangements for varying the pitch of the rotor blade in a predetermined relationship with lead-lag bending of the blade, i.e., bending of the blade in a plane parallel to its plane of rotation.

13 Claims, 23 Drawing Figures

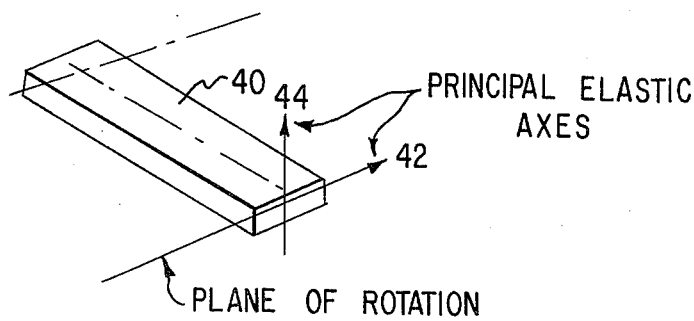
FIG. 4
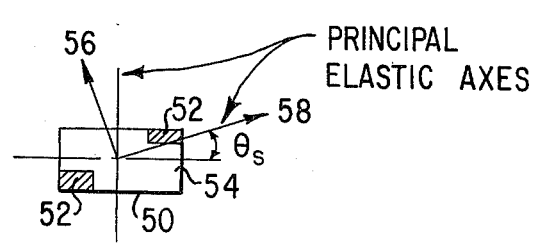
FIG. 5(a)
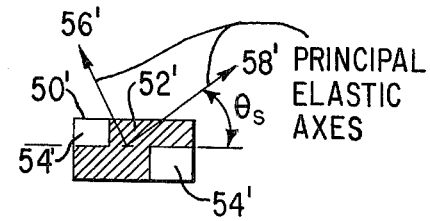
FIG. 5(b)
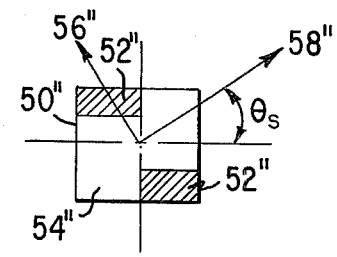
FIG. 5(c)
FIG. 6
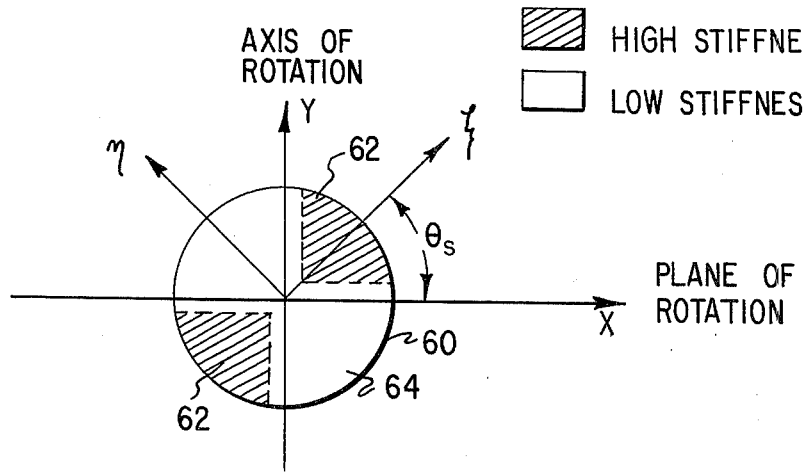

BLADE LAG MOTION

ROTATION DIRECTION

BLADE LEAD MOTION

HINGELESS HELICOPTER ROTOR WITH IMPROVED STABILITY

FIELD OF THE INVENTION

This invention relates to helicopter rotors and, more particularly, to a hingeless helicopter rotor having improved stability characteristics.

BACKGROUND OF THE INVENTION

Helicopter rotors can be grouped into two general categories, hinged and hingeless. Hinged, or articulated, rotors permit movement both perpendicular and parallel to the plane of rotation of the blade to reduce blade stresses. Hingeless rotors eliminate the need for the hinges and utilize elastic deflections of the blade to relieve stress. Hingeless rotors provide reduced rotor complexity and cost as well as improved flying qualities and maneuverability.

Previously known hingeless rotor arrangements characteristicly suffer from a number of substantial drawbacks. For example, nearly all hingeless configurations are prone to aeroelastic instabilities involving rotor blade motions parallel to the plane of rotation. These instabilities can be characterized as isolated rotor instabilities not involving participation of the helicopter fuselage, or as coupled rotor-fuselage instabilities involving coupling between rotor blade motion and fuselage motion. In both cases, the elimination of blade hinges introduces strong structural coupling between individual blade motions and the combined rotor-fuselage motion. In many cases these coupling phenomena are undesirable and produce rotor instability. A particularly important class of instabilities involves a coupled rotor-fuselage instability called ground resonance. This instability may occur whenever the fundamental lead-lag bending frequency of the blade is less than the rotor rotational frequency. Instability problems such as those referred to are usually handled with trial and error design techniques and, in many instances, auxilliary lead-lag dampers must be installed to eliminate the instability. However, this solution, because of the cost and complexity thereof, tends to compromise the basic advantages provided by the use of a hingeless rotor.

SUMMARY OF THE INVENTION

In accordance with the invention, a hingeless helicopter rotor is provided wherein the inherent damping characteristics of the rotor, and hence the stability of the rotor blade motion, are improved. In addition to the basic advantage regarding the prevention of castastrophic instability, the helicopter rotor can be made simpler, lighter and less costly, thereby providing advantages regarding overall performance, efficiency and cost. Generally speaking, the invention comprises a hingeless helicopter rotor having a blade construction wherein the principal elastic flexural axes of the blade are inclined relative to the plane of rotation of the blade, and including an arrangement for providing pitch-lag coupling, i.e., for varying the pitch of the blade in relation to the degree of bending of the blade in a plane parallel to the plane of rotation of the blade, this bending being referred to as "lead-lag" bending.

In one embodiment, the blade is constructed of materials having different stiffnesses to provide the desired inclining of the flex axes, different cross sectional configurations of stiff and less stiff materials producing different angles of inclination. Preferably the angle of inclination provided lies between 30° and 45° with respect to the plane of rotation of the blade.

A specific arrangement providing pitch-lag coupling includes a hollow rigid torque tube which surrounds a flexible blade shank. The torque tube is connected to the blade portion of the rotor blade at one end and is connected to the blade shank at the other end by means of a shear pin and socket assembly. The geometry of the shear pin assembly and the rigid construction of the torque tube forces the blade shank to twist responsive to bending thereof which takes place in a direction parallel to the plane of rotation, thus providing coupling between the blade pitch and bending movements parallel to the plane of blade rotation. This arrangement is suitable for hingeless rotors that include a pitch change bearing in the rotor hub.

Another specific arrangement involving the torque tube and blade shank provides pitch-lag coupling by proper arrangement of the pitch link. The pitch link is used by the operator to adjust blade pitch for controlling the rotor. The proper arrangement of the pitch-link constrains the blade shank to twist when lead-lag bending of the blade shank occurs thus providing the desired pitch-lag coupling. This arrangement is suitable for hingeless rotors that do not include a pitch change bearing in the rotor hub.

Other features and advantages of the invention will be set forth in, or will be apparent from, a detailed description of the preferred embodiments found hereinbelow.

BRIEF DESCRIPTION OF THE DRAWINGS

FIG. 4 is a perspective view of a rotor blade spar constructed of uniform stiffness material which illustrates the locations of the principal elastic flexural axes associated with the blade;

FIGS. 5A, 5B and 5C are transverse cross sectional views of three different embodiments of a blade constructed of non-uniform stiffness materials, illustrating the locations of the principal elastic flexural axes provided by these constructions;

FIG. 6 is a transverse cross sectional view of a blade constructed of non-uniform stiffness materials used to illustrate a method of calculation of the location of the principal flexural axes;

DESCRIPTION OF THE PREFERRED EMBODIMENTS

As mentioned above, in accordance with the invention a rotor blade is provided which combines (1) inclined principal elastic flexural axes and (2) pitch-lag coupling, that is, coupling of the pitching of the rotor blade, i.e., the tilt of the blade with respect to its plane of rotation, with lead-lag bending, i.e., bending which occurs in a plane parallel to the plane of rotation of the blade.

Figures 1, 2, 3:
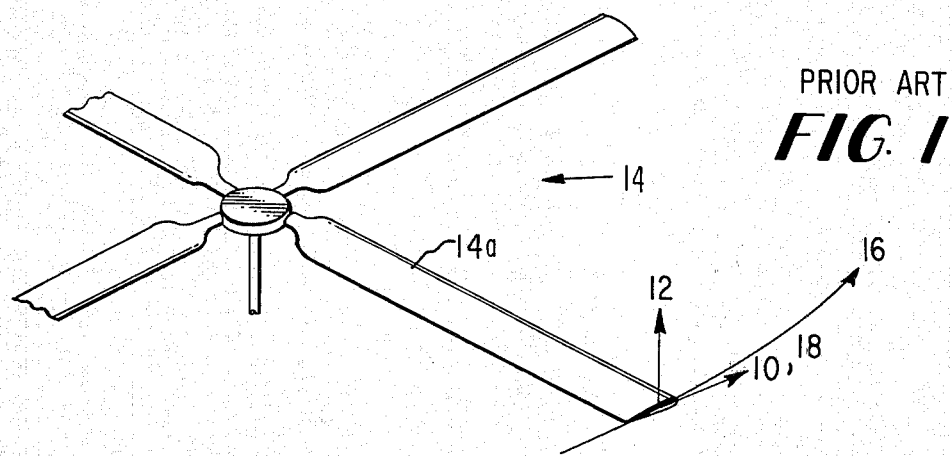
FIG. 1 is a simplified perspective view of a conventional helicopter rotor illustrating the location of the principal elastic flexural axes.
FIG. 2 is a perspective view similar to that of FIG. 1 illustrating the location of the principal elastic flexural axes in a blade constructed in accordance with the invention.
FIG. 3 is a perspective view similar to that of FIG. 1 illustrating rotor blade movement that results from coupling the pitching of the blade to the lead-lag bending of the blade.

To provide a better understanding of the invention, certain background considerations will be briefly investigated. Referring to FIG. 1, arrows 10,12 illustrate the locations and the directions of the principal flexural axes of a rotor blade 14a of a conventionally designed helicopter rotor assembly generally denoted 14. As illustrated, the first principal flexural axis 10 coincides with the major axis of the cross section of the blade 14a i.e., the longitudinal cross sectional dimension of the blade, and points in the direction of rotation which is indicated by arrow 16. The second principal flexural axis 12 is perpendicular to axis 10.

It should be noted that FIG. 1 is an idealization of a conventional rotor blade. In reality, the principal flexural axes may be inclined at a slight angle to the plane of rotation as an indirect result of slight non-uniformities in stiffness of the blade materials and because of twist of the rotor blade. These small inclinations are not significant however.

As discussed hereinabove, in accordance with the present invention, the principal flexural axes are steeply inclined. Thus, referring to FIG. 2, the primary flex axes indicated by arrows $10'$, $12'$ are inclined an angle $\Theta_s$ from the plane of rotation of blade $14a'$. The pitch of the blade $14a'$, which can be defined as the inclination of major axis $18'$ relative to the plane of rotation of blade $14a'$ is not changed from its orientation shown in FIG. 1. An arrangement for inclining the flexural axes without changing the pitch of the blade will be discussed below. At this point it will suffice to note that in conventionally designed blades, the two primary bending modes take place along the principal flexural axes and remain relatively uncoupled; blades with steeply inclined principal axes produce significant coupling of the primary bending modes.

As was also mentioned previously, the invention concerns providing pitch-lag coupling in addition to inclination of the principal flexural axes. Referring to FIG. 3, a rotor blade assembly is illustrated which includes a rotor blade 20. Rotor blade 20, in the rest position illustrated in solid lines, (i.e., when pointing in the direction indicated by arrow 28) has a pitch of zero degrees. Under these conditions, the major axis of blade 20, which is indicated at 24, points in the direction of rotation of blade 20. It should be pointed out that when reference is made to zero pitch or to positive or negative pitch, this does not include the pitch of the blade that the helicopter operator has direct control over and that is used for maneuvering and control. Referring again to FIG. 3, as blade 20 "lags" back from rest position 28 to a lag position 30 during blade rotation, pitch-lag coupling provides for the pitch of blade 20 to increase $+\Delta\Theta$ so that its major axis 24 is inclined from the plane of rotation 22 by this angle. When blade 20 "leads" rest position 30 so as to be located in a position such as indicated at 32, the major axis 24 is declined from the plane of rotation 22 so as to provide a negative pitch of $-\Delta\Theta$. The rotation in question can be produced in several ways including appropriate rigging of the blade pitch controls, i.e., the aforementioned operator controls, or by using special blade designs. Both of these techniques are conventional and are employed in some helicopters now in use. Two approaches for achieving pitch-lag coupling will be discussed below.

Before discussing the embodiment for providing pitch-lag coupling, an exemplary embodiment which provides inclination of the principal flexural axes will be considered with reference to FIGS. 4, 5A to 5C and 6. As discussed below, the concept illustrated by the embodiments of FIGS. 5A to 5C and FIG. 6 are incorporated in the embodiment providing pitch-lag coupling. It should be emphasized that inclination of the principal flexural axes can be achieved in a number of ways and the embodiments discussed below are given as examples only.

FIG. 4 shows a blade spar 40 which is of conventional design and which includes principal elastic axes 42, 44 that generally coincide with the geometric axes of symmetry of the blade or blade spar cross section. If the blade spar is rectangular in cross section and of uniform stiffness material, then the principal elastic flexural axes will coincide with the axes of symmetry of the rectangle. In order to rotate the principal axes, a blade or spar in accordance with a preferred embodiment of the invention is constructed of materials of dissimilar stiffness. In this manner, the flexural axes are oriented at the desired angle with respect to the plane of rotation by selective distribution of stiff and less stiff materials. Referring to FIG. 5A, there is shown a cross section of blade 50 which is basically constructed of a relatively low stiffness material 54, but which includes first and second portions 52 that are constructed of a high stiffness material and are arranged at opposite corners of blade 50 as illustrated. This cross-sectional configuration provides rotation of elastic flexural axes to the positions indicated at 56 and 58. For non-uniform stiffness cross sections with lumped concentrations of stiffness, such as illustrated, the orthogonal principal axes will pass approximately through and between the areas of high stiffness. Two further configurations are illustrated in FIGS. 5B and 5C, with elements similar to those of FIG. 5A being given the same numbers with primes attached in FIG. 5B and with double primes attached in FIG. 5C.

The orientation of the actual flexural axes can be calculated from the stiffness distribution of material within the blade cross section and the geometry of the cross section. Referring to FIG. 6, an exemplary blade 60 is shown which is of arbitrary cross section and which is constructed of high stiffness material 62 and low stiffness material 64 arranged in an arbitrary configuration producing inclined axes $\zeta$ and $\eta$. The $x$ and $y$ axes shown in FIG. 6 are parallel and perpendicular, respectively, to the plane of rotation of the blade and pass through the neutral axis of the blade cross section. The bending stiffness parameters for this nonuniform stiffness cross section are defined by the following formulas:

$$(EI)_{xx} = \iint E(x,y)y^2 dxdy$$

$$(EI)_{yy} = \iint E(x,y)x^2 dxdy$$

$$(EI)_{xy} = \iint E(x,y)xy dxdy$$

where $E$ is the stiffness of the blade material, i.e., Young's Modulus and $(EI)$ is the bending stiffness. In the case of a uniform stiffness cross section these formulas reduce to the common case where $(EI)_{xx} = EI_{xx}$, etc., where $I_{xx}, I_{yy}$ are the usual cross section moments of inertia and $I_{xy}$ is the cross section product of inertia. The principal flexural axes of the blade are the axes $\eta$ and $\zeta$, inclined at an angle $\Theta$, where $\Theta$ is given by the following formula:

$$\theta = \frac{1}{2} \tan^{-1}\left[\frac{2(EI)_{xy}}{(EI)_{xx} - (EI)_{yy}}\right].$$

The bending stiffnesses about the $\zeta$ and $\eta$ axes are given by the following formulas:

$$(EI)_{\zeta\zeta} = (EI)_{xx}\cos^2\theta + (EI)_{yy}\sin^2\theta - (EI)_{xy}\sin 2\theta$$

$$(EI)_{\eta\eta} = (EI)_{xx}\sin^2\theta + (EI)_{yy}\cos^2\theta + (EI)_{xy}\sin 2\theta$$

$$(EI)_{\eta\zeta} = [(EI)_{xx} - (EI)_{yy}]\frac{\sin 2\theta}{2} + (EI)_{xy}(\cos^2\theta - \sin^2\theta)$$

In order for the inclination angle $\Theta$ to be properly defined, and for the inclination of the principal flexural axes to produce the desired beneficial effects, it is necessary that the bending stiffness parameters $(EI)_{\zeta\zeta}$ and $(EI)_{\eta\eta}$ be unequal or that $(EI)_{xy}$ not be equal to zero.

Figure 7:
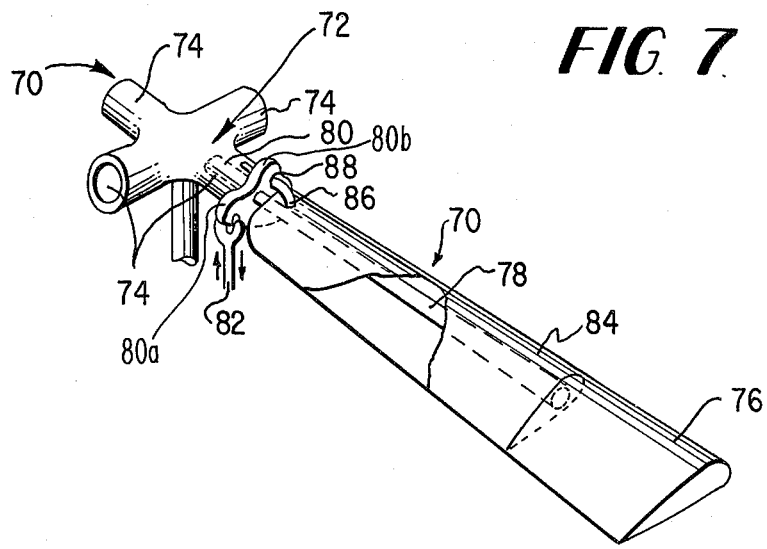
FIG. 7 is a perspective view of a preferred embodiment of an arrangement for coupling pitching with lead-lag bending for a configuration including a pitch change bearing in the rotor hub.

FIG. 7 illustrates a preferred embodiment incorporating both inclined flexural axes and pitch-lag coupling. A helicopter rotor assembly 70 includes a rotor hub 72 with four pitch change bearings in the hub bearings 74. A rotor blade 76 has a blade shank 78 attached thereto, blade shank 78 terminating in a shank root 80 that is received in a hub bearing 74. Shank root 80 includes a pitch link connection flange 80a which is coupled to a pitch link control member 82 controlled by the helicopter operator. Vertical motion of pitch link control member 82 produces rotation of blade 76, blade shank 78 and shank root 80 on the bearing 74 so as to provide the pitch changes that the helicopter operator requires for control purposes. Blade shank 78 is constructed of materials of different stiffnesses so as to provide the inclined principal flexural axes described above and is connected to the blade 76 at a point which is about 15 to 20% of the distance between the center of the rotor and the blade tip.

An arrangement including a torque tube 84, a shear pin 86 and a shear pin socket 88 to provide the desired pitch-lag coupling. The torque tube 84, which is hollow so as to permit receipt of blade shank 78 therein, is rigidly fixed to blade 76 and is constructed of high stiffness materials. Socket 88 is formed in a second flange 80b of shank root 80. The shear pin 86 is secured to and extends outwardly from one end of the torque tube 84 and is inserted into socket 88, thus pinning the torque tube 84 to the shank root 80 and hub 72. The geometry of the shear pin 86 and socket 88 prevents linear transverse deflections at this point, but permits angular deflections and rotations. Since the shear pin 86 and socket 88 are positioned vertically above the blade shank 78 and the torque tube 84 can not bend or twist, the blade shank 78 must twist during leading or lagging movements so as to keep the pin 86 in socket 88. The arrangement described above produces a positive pitch for blade lag and a negative pitch for blade lead.

Figures 8A, 8B, 8C:
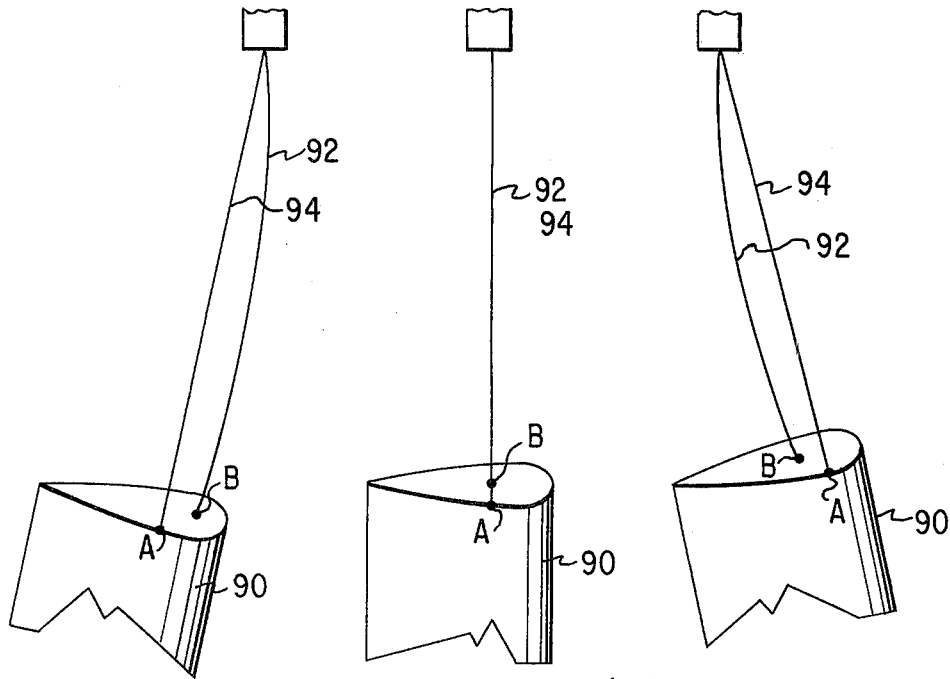
FIGS. 8A, 8B and 8C are diagrammatic, highly simplified views of the assembly in FIG. 7 used in illustrating the correspondence between lead-lag bending and pitching for three different conditions.
Figures 9A, 9B, 9C:
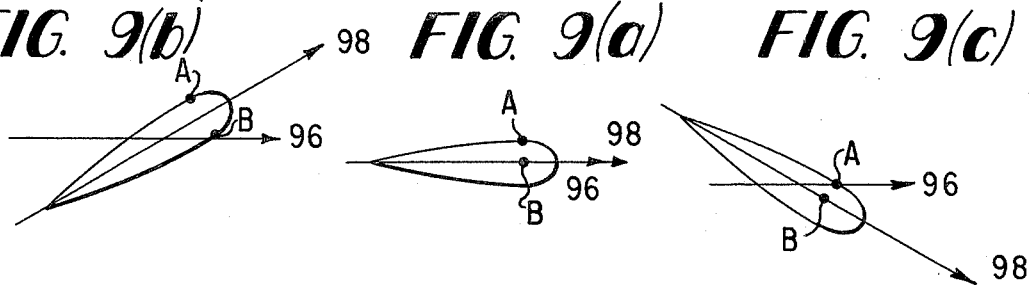
FIGS. 9A, 9B and 9C are transverse cross sectional views of the blades of FIGS. 8A, 8B and 8C.

FIGS. 8A to 8C and 9A to 9C illustrate the operation of the system in FIG. 7. Referring to FIGS. 8A and 9A, when blade 90 is at rest, the torque tube, indicated at 94 and the blade shank 92 are aligned vertically with each other so that the inclination of blade axis indicated at 98 with respect to the plane of rotation 96 is zero degrees. Again, as mentioned above, the pitch referred to does not include the pitch that results from the motion of pitch link 82 in FIG. 7, which is operator controlled and not coupled to blade lead or lag. When the blade 90 lags back from the rest position thereof as indicated in FIG. 8B, the blade shank 92 bends and torque tube 94, being rigid, forces the blade shank 92 to twist thereby producing a positive inclination of the blade axis 98 with respect to the plane of rotation 96. Similarly, as illustrated in FIGS. 8C and 9C, when the blade leads the rest position thereof so as to cause the blade shank 92 to bend forward, the torque tube 94 forces the blade shank to twist thereby producing a negative angle between the blade axis 98 and the plane of rotation 96.

Figure 10:
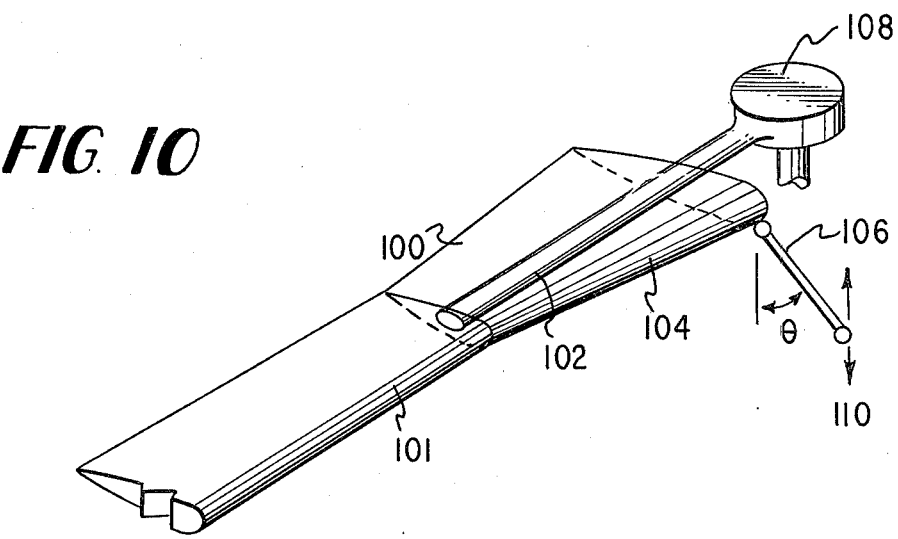
FIG. 10 is a perspective view of an arrangement for coupling pitching with lead-lag bending for a configuration not having a pitch change bearing in the rotor hub.

Referring to FIG. 10, a further embodiment according to the invention is illustrated. A helicopter rotor 100 comprising a blade 101, a blade shank 102, a torque tube 104, a pitch link 106 and a rotor hub 108, is shown. Rotor shank 102 incorporates inclined principal flexural axes as described hereinabove. This embodiment has as an advantage the elimination of the rotor hub bearing, thereby simplifying rotor hub 108. Except for the combination of inclined principal flexural axes and pitch-lag coupling, the configuration shown in FIG. 10 is known in the art. The desired pitch-lag coupling is obtained from the kinematics of pitch link 106 and is described herein below.

Figure 12A:
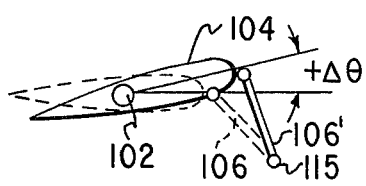
FIGS. 12A, 12B and 12C are transverse cross sectional views of the blades of FIGS. 11A, 11B and 11C.
Figure 11B:
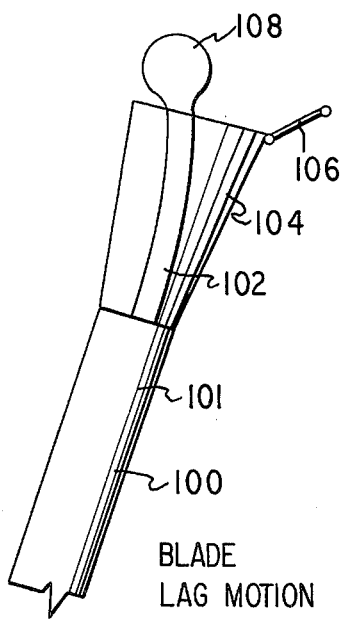
FIGS. 11A, 11B and 11C are diagrammatic simplified views of the assembly in FIG. 10 used in illustrating the correspondence between lead-lag bending and pitching for three different conditions.
Figure 11A:
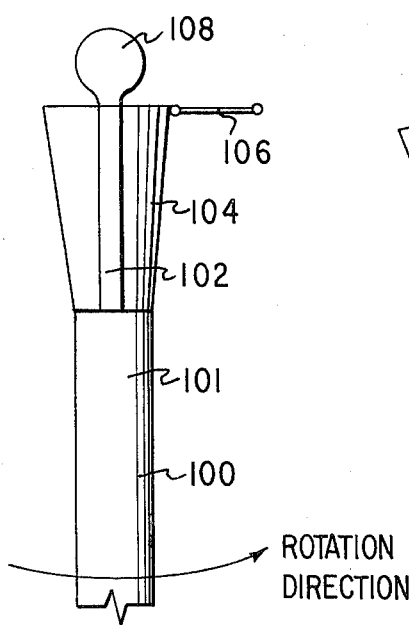

Referring to FIGS. 11A and 12A, rotor 100 is shown in the rest position, i.e., with no lead-lag bending. Point 115 in FIG. 12A is fixed, and its vertical motion in the direction of the arrow 110 is controlled by the helicopter operator. Pitch link 106 is tilted away from the vertical plane by an angle $\Theta$. Vertical motions of point 115 in the direction of arrow 110 are for conventional blade pitch control for maneuvering.

Figures 12B, 12C:
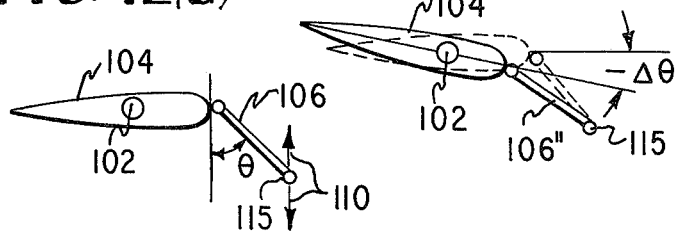
Figure 11C:
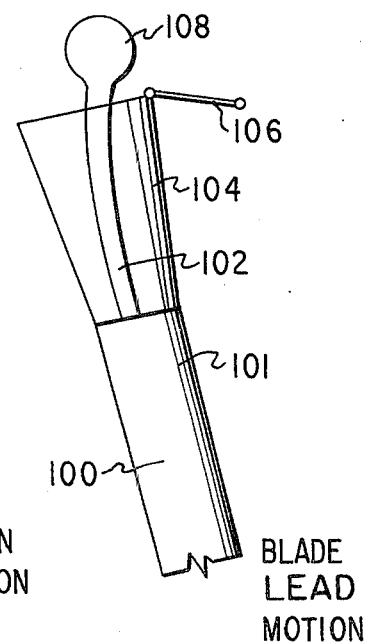

Referring now to FIG. 11B, rotor blade 101 is shown lagging during rotation due to bending of rotor shank 102. As seen in FIG. 12B, lag bending forces torque tube 104 and blade 101 to increase its pitch by an angle $+\Delta\Theta$ by the kinematics of torque tube 104, pitch link 106 and fixed point 115. Referring to FIGS. 11C and 12C, similar action forces torque tube 104 and blade 101 to decrease its pitch $-\Delta\Theta$ when blade 101 leads during rotation.

Figure 13:
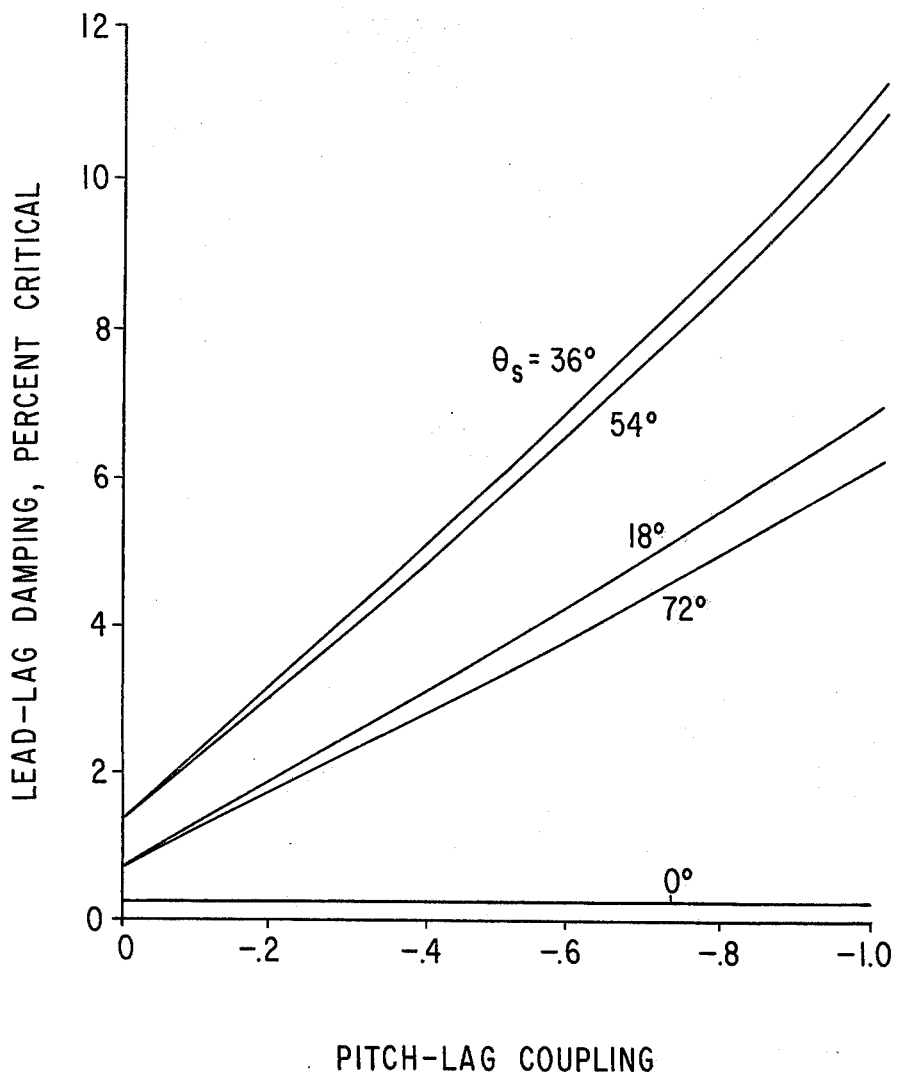
FIG. 13 is a diagram or graph which plots aerodynamic lead-lag damping as a function of pitch-lag coupling for various inclinations of the principal flexural axes.

Referring to FIG. 13 there is shown a diagram which illustrates the benefits of the invention. In the diagram, the vertical axis represents aerodynamic damping of the free vibrations of the blade at the lead-lag natural frequency and is given in terms of percent of critical damping. The horizontal axis represents pitch-lag coupling which is defined as the ratio of the increase in the blade pitch angle to the increase in the blade lead angle. Aerodynamic lead-lag damping is plotted as a function of pitch-lag coupling for six different values of $\Theta_s$, the angle of inclination of the principal flexural axes. The values of aerodynamic lead-lag damping pertain to a helicopter rotor blade with a Lock number of 8, and having bending stiffness with respect to the principal flexural axes such that the two bending natural frequencies of the blade (when not rotating) are equal to 0.7 and 0.458 times the normal operating rotational frequency of the rotor. Furthermore, the pitch angle of the rotor blade is zero; that is, the rotor is operating at the zero lift condition, which is the most critical with regard to aerodynamic lead-lag damping that is associated with ground resonance instability for a helicopter resting in ground contact. It is noted that hingeless rotor blades normally exhibit approximately ½ to 1 percent damping due to hysteresis of the blade material (this damping being referred to as structural damping) and that this value is not included in FIG. 13. Damping on the order of 4–5% may be required to prevent rotor instabilities such as ground resonance. FIG. 13 demonstrates that percentage values for aerodynamic damping up to 11% result from a combination of pitch-lag coupling with inclined principal flexural axes for angles of inclination from about 30° to 45°. The curves in FIG. 13 also demonstrate that decidedly superior results are achieved by combining the techniques of inclining the principal flexural axes and providing pitch-lag coupling since when either one of the other technique is not used, the resulting aerodyamic damping falls off to near zero. It is not necessary that the pitch-lag coupling be provided as a result of kinematics of specially arranged mechanical linkages, pins, sockets, etc.; but the invention includes embodiments wherein the pitch-lag coupling may be provided by the inherent elastic or structural properties of the blade spar.

Although the invention has been described with respect to exemplary embodiments thereof, it will be understood that variations and modifications can be effected in these embodiments without departing from the scope or spirit of the invention.

We claim:

1. An improved hingeless helicopter rotor comprising
    a rotor hub;
    a blade connected to said rotor hub for rotation therewith, said blade having the principal flexural axes thereof inclined from the plane of rotation of said blade when said blade has zero pitch; and
    means for varying the pitch of said blade in relationship to the degree of bending of such blade in a plane parallel to the plane of rotation of said blade to damp blade oscillations and increase blade stability.

2. A rotor as claimed in claim 1, wherein the angle of inclination of the principal flexural axes lies between approximately 30° and 45° as measured from the plane of rotation of said blade.

3. A rotor as claimed in claim 1, wherein said blade is constructed of materials of non-uniform stiffness, which provide inclination of said principal flexural axes.

4. A rotor as claimed in claim 1, wherein said blade is constructed of materials which are of different stiffnesses and are geometrically arranged to provide inclination of said principal flexural axes.

5. An improved hingeless rotor comprising
    a rotor hub;
    a blade connected to said rotor hub for rotation therewith, said blade having the principal flexural axes thereof inclined from the plane of rotation of said blade;
    means for varying the pitch of said blade in relationship to the degree of bending of said blade in a plane parallel to the plane of rotation of said blade;
    said blade including a blade portion and an elongated shank portion connected to the rotor hub, said pitch means comprising a hollow rigid torque tube which surrounds said shank portion and is affixed to said blade portion at one end thereof; and
    means for coupling said torque tube to said rotor hub such that transverse linear deflections of said torque tube are prevented while angular and rotational reflections are permitted thereby forcing the blade shank to twist in response to bending thereof which takes place in a direction parallel to the plane of rotation.

6. A rotor as claimed in claim 5, wherein said shank portion is connected to said hub through a shank root portion and said torque member is coupled to said blade root portion.

7. A rotor as claimed in claim 5, wherein said coupling means comprises
    a socket formed in said shank root portion, and
    a shear pin which extends outwardly from the top of said torque tube at the other end of said torque tube and is received in said socket.

8. A rotor as claimed in claim 1, wherein a plurality of said blades connected to said hub for rotation therewith, each of said blades having the principal flexural axes thereof inclined from the plane of rotation of said blades and including means for varying the pitch of that blade in relation to the degree of bending of that blade in a plane parallel to the plane of rotation of the blades.

9. An improved hingeless helicopter rotor comprising
    a rotor hub;
    a blade connected to said rotor hub for rotation therewith, said blade having the principal flexural axes thereof inclined from the plane of rotation of said blade;
    means for varying the pitch of said blade in relationship to the degree of bending of said blade in a plane parallel to the plane of rotation of said blade;
    said blade including a blade portion and an elongated shank portion connected to said rotor hub, said pitch varying means comprising a hollow rigid torque tube which surrounds said shank portion and is affixed to said blade portion at one end thereof; and
    a pitch link member coupled to the other end of said torque tube so as to force said blade shank to twist in response to bending thereof which takes place in a direction parallel to the plane of rotation.

10. An improved hingeless helicopter rotor adapted to damp lead-lag oscillations and reduce the likelihood of ground resonance comprising
    a rotor hub;
    a rotor, the root portion of said rotor being a blade shank;